United States Patent [19]

Houkita et al.

[11] Patent Number: 4,689,959
[45] Date of Patent: Sep. 1, 1987

[54] VARIABLE-CAPACITY TURBOCHARGER

[75] Inventors: Atsushi Houkita, Katsuta; Tomio Hokari, Mito, both of Japan

[73] Assignee: Hitachi, Ltd., Tokyo, Japan

[21] Appl. No.: 881,402

[22] Filed: Jul. 2, 1986

[30] Foreign Application Priority Data

Jul. 3, 1985 [JP] Japan ............................. 144785/85

[51] Int. Cl.4 .......................................... F02B 37/12
[52] U.S. Cl. ................................... 60/602; 415/151
[58] Field of Search ............... 60/600, 601, 602, 603; 415/151, 205

[56] References Cited

U.S. PATENT DOCUMENTS 4,395,884  8/1983  Price .................................... 60/602
4,617,799 10/1986  Todokoro et al. ............. 415/151 X

FOREIGN PATENT DOCUMENTS 1947441  4/1971  Fed. Rep. of Germany .
1337864  8/1963  France .
2035147 12/1970  France .
172427  10/1983  Japan ................................. 60/602
19918   1/1985  Japan .
128931  7/1985  Japan .
212623 10/1985  Japan ................................. 60/602

OTHER PUBLICATIONS

*Automotive Engineering,* vol. 93, No. 11, Nov. 1985, pp. 83–90.

*Primary Examiner*—Michael Koczo
*Attorney, Agent, or Firm*—Antonelli, Terry & Wands

[57] ABSTRACT

A turbocharger driven by exhaust gases of an internal combustion engine wherein a scroll is split into two sections extending side by side in parallel to the direction of flow of the exhaust gases. A control valve for controlling the inflow of exhaust gases into at least one of the two sections of the scroll is provided, and a valve seat structure cooperating with the control valve is formed separately from a turbine casing and secured in place between an inlet portion of the turbocharger and an exhaust passageway of the engine.

7 Claims, 4 Drawing Figures

4,689,959

VARIABLE-CAPACITY TURBOCHARGER

BACKGROUND OF THE INVENTION

(1) Field of the Invention

This invention relates to turbochargers driven by exhaust gases of an internal combustion engine, and more particularly it is concerned with a variable-capacity turbocharger capable of varying its capacity in accordance with the operating condition of the engine.

(2) Description of the Prior Art

Two types of variable-volume turbochargers have hitherto been known. They include:

(1) One type having a valve body located upstream of the turbine and including an exhaust flow control valve as disclosed in Japanese Patent Unexamined Publication No. 120014/78; and (2) The other type having an exhaust flow control valve located within the exhaust manifold, as disclosed in Japanese Patent Unexamined Publication No. 118521/81.

These two types of variable-capacity turbochargers of the prior art have encountered the following problems. The turbocharger of type (1) including the valve body becomes large in overall size, making it quite difficult to mount it in a small size passenger automotive vehicle without effecting extensive alterations in design in the engine and accessory equipment.

Meanwhile in the case of the turbocharger of type (2), the arrangement whereby the exhaust flow control valve is mounted in such a manner that it closes in the direction of flow of exhaust gases requires a high drive force when the flowrate of exhaust gases suddenly increases as when the engine is accelerated.

SUMMARY OF THE INVENTION

(1) Object of the Invention

This invention has been developed for the purpose of obviating the aforesaid problems of the prior art. Accordingly, the invention has as its object the provision of a variable-capacity turbocharger which is small in size and requires a low drive force for operating the exhaust flow control valve.

(2) Statement of the Invention

The outstanding characteristics of the invention enabling the aforesaid object to be accomplished include exhaust flow control valve means adapted to open in the direction of flow of exhaust gases which is mounted in at least one of two exhaust introducing passageways each communicating with one of two scroll chambers, and valve seat means separate from a turbine casing which is located in a turbine inlet portion and cooperates with the exhaust flow control valve means to open and close the exhaust introducing passageway in which the exhaust flow control valve means is located.

DESCRIPTION OF THE PREFERRED EMBODIMENTS

Figure 1:
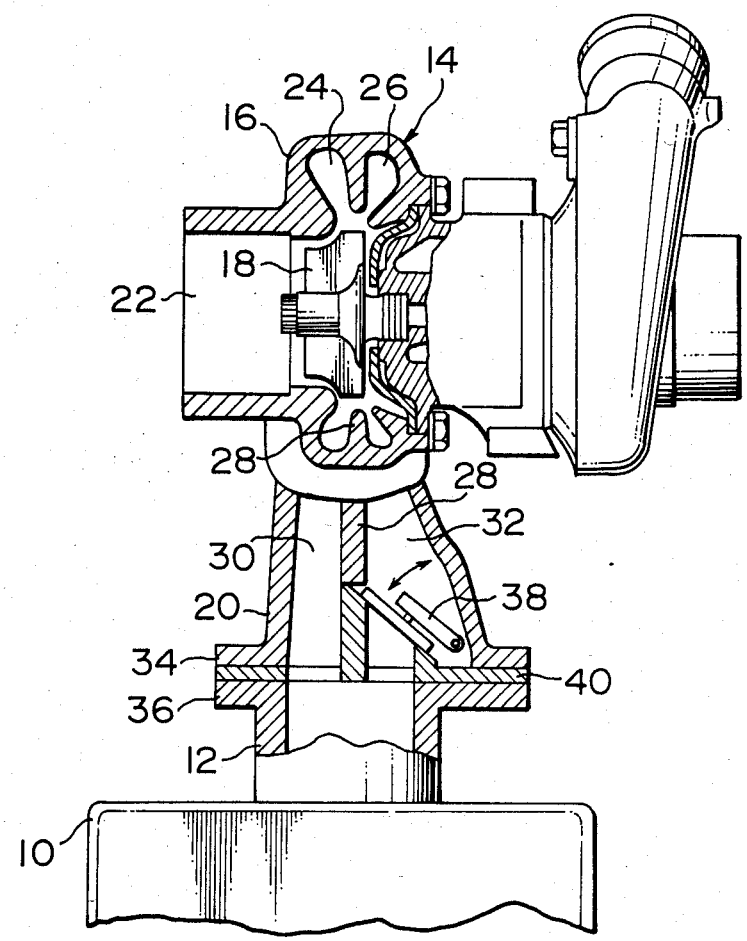
FIG. 1 is a sectional view of one embodiment of the variable-capacity turbocharger in conformity with the invention.

Referring to FIG. 1, the reference numeral 10 designates an engine. Exhaust gases from the engine 10 flow through an exhaust passageway 12 and are released into the atmosphere after actuating a turbocharger 14.

The turbocharger 14 includes a turbine section comprising a turbine casing 16, a turbine impeller 18 located in the turbine casing 16, a turbine inlet portion 20 and a turbine outlet portion 22.

The turbine casing 16 is formed with a first scroll chamber 24 and a second scroll chamber 26 separated from each other by a partition wall 28 extending halfway into the turbine inlet portion 20 as shown.

The turbine inlet portion 20 which is divided into a first exhaust introducing passageway 30 communicating with the first scroll chamber 24, and a second exhaust introducing passageway 32 communicating with the second scroll chamber 26 has a flange 34 at which the turbine inlet portion 20 is bolted to a flange 36 of the exhaust passageway 12.

Located within the second exhaust introducing passageway 32 is an exhaust flow control valve 38 which is adapted to open in a direction in which exhaust gases flow. As is well known, the exhaust flow control valve 38 is controlled in operation by a drive control, such as a subatmospheric pressure actuator or electric actuator.

A valve seat structure 40 is mounted between the flange 34 of the turbine inlet portion 20 and the flange 36 of the exhaust passageway 12 to cooperate with the exhaust flow control valve 38 to control the flowrate of exhaust gases flowing into the second exhaust introducing passageway 32.

Figure 2:
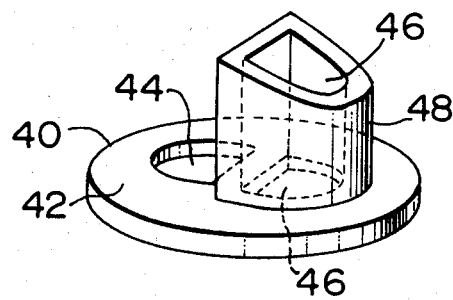
FIG. 2 is a perspective view of the valve seat structure.

The valve seat structure 40 includes, as shown in FIG. 2, a plate member 42 held between the two flanges 34 and 36, a first opening 44 communicating with the first exhaust introducing passageway 30, a second opening 46 communicating with the second exhaust introducing passageway 32 and a substantially cylindrical portion 48 separating the second opening 46 from the first exhaust introducing passageway 30. The valve seat structure 40 is formed of heat-resistant material, such as stainless steel.

The substantially cylindrical portion 40 which has an open lower end adjacent the second opening 46 has an open upper end cooperating with the exhaust flow control valve 38 to adjust the flowrate of exhaust gases flowing through the second opening 46.

When the exhaust flow control valve 38 is in a closed position, exhaust gases are introduced into the first scroll chamber 24 in the turbine casing 16 via the exhaust passageway 12, the first opening 44 of the valve seat structure 40 and the first exhaust introducing passageway 30 in the turbine inlet portion 20.

Meanwhile upon the exhaust flow control valve 38 being brought to an open position, exhaust gases flow through the second opening 46 of the valve seat structure 40 and the second exhaust introducing passageway 32 in the turbine inlet portion 20 into the second scroll chamber 26 in the turbine casing 16.

Thus by selecting the scroll chamber and adjusting the flowrate of exhaust gases introduced into the selected scroll chamber, it is possible to vary the capacity of the turbocharger 14.

In the embodiment of the aforesaid construction, the need to increase the size of the turbocharger to render same variable in capacity can be eliminated because the exhaust flow control valve 38 can be mounted within the turbine inlet portion 20. With the exhaust flow control valve 38 being adapted to open in a direction in which the exhaust gases flow, it is not necessary to increase a force for driving and controlling same. The valve seat structure 40 located between the turbine inlet portion 20 and the exhaust passageway 12 is formed of material of high heat resistance, thereby offering the advantage that production costs can be reduced as compared with a variable-capacity turbocharger having a turbine casing formed entirely of heat-resistant material.

In the embodiment, the valve seat structure 40 is formed of heat-resistant material to prevent strain crack formation which might be caused by thermal stress produced by heat leak. The strain crack formation tends to occur near the flange 34 of the turbine inlet portion 20.

The process for assembling the exhaust flow control valve 38 in the turbine inlet portion 20 will be described. First, the turbine casing 16 and the exhaust passageway 12 are disconnected, and the valve seat structure 40 and the exhaust flow control valve 38 are made ready for assembling.

Then, the exhaust flow control valve 38 is placed in position in the second exhaust introducing passageway 32 and adjusted to be in normal working order. Thereafter, the valve seat structure 40 is mounted to the flange 34 of the turbine inlet portion 20 and held between it and the flange 36 of the exhaust passageway 12.

The valve seat structure 40 may be mounted and secured to the flange 34 of the turbine inlet portion 20. When this is the case, the work of rendering the turbocharger variable in capacity is completed while it is still in the stage of production.

The embodiment shown in FIG. 1 is rather simple in construction. Other constructional forms will now be described.

Figure 3:
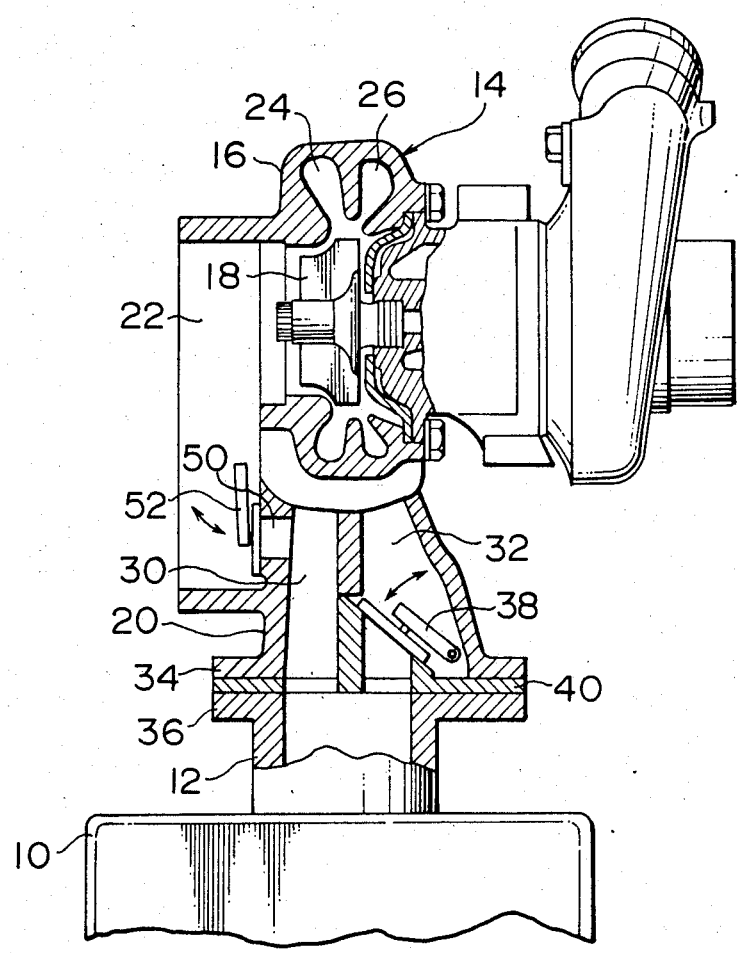
FIGS. 3 and 4 are sectional views of the variable-capacity turbocharger of other constructional forms according to the invention.

FIG. 3 shows another embodiment in which the first exhaust introducing passageway 30 is communicated with the turbine outlet portion 22 via a bypass aperture 50 which is opened and closed by a bypass valve 52. In this embodiment, it is possible to control the flowrate of exhaust gases flowing into the first scroll chamber 24. The embodiment shown in FIG. 3 is similar to the embodiment shown in FIG. 1 in other respects.

Figure 4:
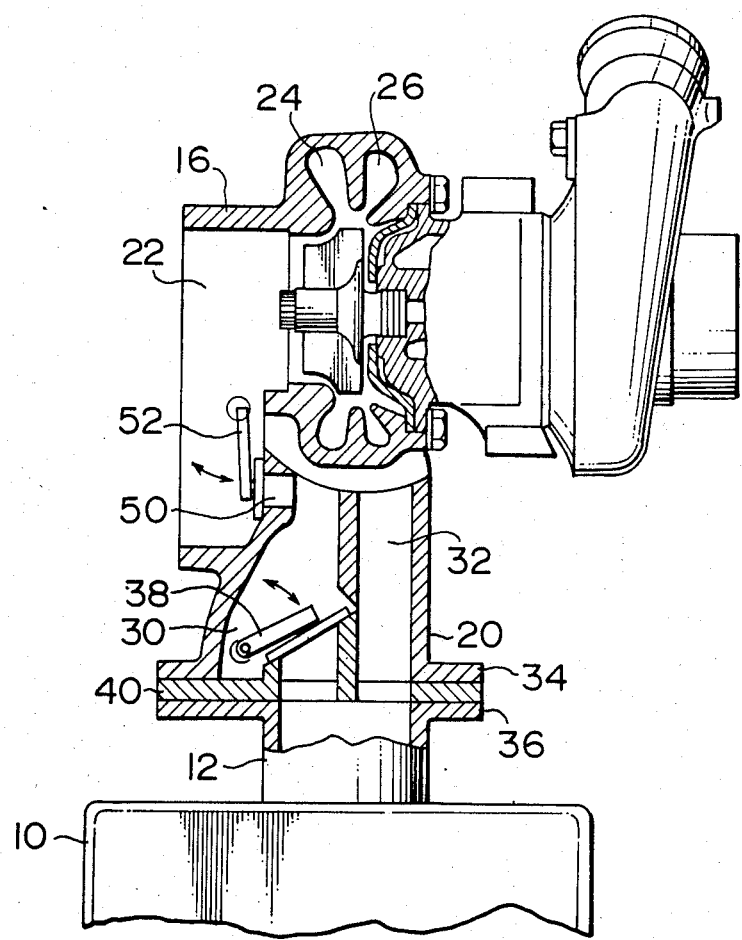

FIG. 4 shows still another embodiment in which the exhaust flow control valve 38 is located within the first exhaust introducing passageway 30, and the bypass aperture 50 and bypass valve 52 are mounted in the same manner as described by referring to the embodiment shown in FIG. 3.

According to the invention, the exhaust flow control valve 38 may be located in one or both of the first and second exhaust introducing passageways 30 and 32. The first and second exhaust introducing passageways 30 and 32 have been so named for convenience' sake, and any one of the two passageways 30 and 32 may be called the first exhaust introducing passageway while calling the other passageway the second exhaust introducing passageway.

It is to be understood that the constructional forms of the variable-capacity turbocharger according to the invention may be varied depending on the type of automotive vehicles for which the turbocharger is intended and on the specifications for controlling the turbocharger. What is essential is that the turbocharger according to the invention has, in its basic form, two exhaust introducing passageways.

From the foregoing description, it will be appreciated that the variable-capacity turbocharger according to the invention is compact in overall size and requires a drive force of low magnitude for its exhaust flow control valve.

What is claimed is:

1. A variable-capacity turbocharger comprising:
   (a) a turbine casing having a turbine inlet portion, a turbine outlet portion and a scroll chamber;
   (b) a turbine impeller located in said scroll chamber and having a multiplicity of blades;
   (c) a partition wall extending to the vicinity of said turbine inlet portion to partition said scroll chamber into a first scroll chamber and a second scroll chamber and to define a first exhaust introducing passageway and a second exhaust introducing passageway for introducing exhaust gases separately into said first scroll chamber and second scroll chamber respectively;
   (d) exhaust flow control valve means located at least in said second exhaust introducing passageway and opening in the direction of flow of the exhaust gases; and
   (e) valve seat means formed separately from the turbine casing and located in the turbine inlet portion, said valve seat means cooperating with said exhaust flow control valve means to control the flowrate of exhaust gases flowing into said second exhaust introducing passageway.

2. A variable-capacity turbocharger as claimed in claim 1, wherein said valve seat member is formed of heat-resistant metallic material.

3. A variable-capacity turbocharger as claimed in claim 2, wherein said heat-resistant material is stainless steel.

4. A variable-capacity turbocharger as claimed in claim 1, wherein said valve seat means includes a plate member interposed between the turbine inlet portion and an exhaust passageway of an engine, a first opening located in the vicinity of a central portion of the plate member and communicating with the first exhaust introducing passageway, a second opening located in said plate member adjacent the first opening, and a substantially cylindrical portion located vertically on the plate member and having two open ends, one of said two open ends being connected to the second opening and the other open end communicating with the second opening via the one open end and serving as a valve seat for the exhaust flow control valve means.

5. A variable-capacity turbocharger as claimed in claim 4, wherein a wall of said substantially cylindrical portion extends in part to an end portion of said partition wall to be connected thereto to separate the second exhaust introducing passageway from the first exhaust introducing passageway.

6. A variable-capacity trubocharger as claimed in claim 1, further comprising a bypass aperture maintaining the first exhaust introducing passageway in communication with the turbine outlet portion, and a bypass valve mounted in said bypass aperture.

7. A variable-capacity turbocharger as claimed in claim 1, further comprising a bypass aperture maintaining the second exhaust introducing passageway in communication with the turbine outlet portion, and a bypass valve mounted in said bypass aperture.

* * * * *